United States Patent
Chen et al.

(10) Patent No.: US 11,307,795 B2
(45) Date of Patent: Apr. 19, 2022

(54) ELECTRONIC PROCESSING DEVICES AND MEMORY CONTROL METHODS THEREOF

(71) Applicant: Nuvoton Technology Corporation, Hsinchu Science Park (TW)

(72) Inventors: Pin-Ren Chen, Taichung (TW); Tzu-Lan Shen, Taoyuan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/114,932

(22) Filed: Dec. 8, 2020

(65) Prior Publication Data
US 2021/0173584 A1  Jun. 10, 2021

(30) Foreign Application Priority Data
Dec. 9, 2019  (TW) .................. 108144856

(51) Int. Cl.
*G06F 8/65* (2018.01)
*G06F 3/06* (2006.01)
*G06F 9/4401* (2018.01)

(52) U.S. Cl.
CPC .......... *G06F 3/0655* (2013.01); *G06F 3/0604* (2013.01); *G06F 3/0679* (2013.01); *G06F 8/65* (2013.01); *G06F 9/4403* (2013.01)

(58) Field of Classification Search
CPC ...................................................... G06F 8/65
See application file for complete search history.

(56) References Cited

U.S. PATENT DOCUMENTS

| 6,070,012 A * | 5/2000 | Eitner | G06F 8/656 717/168 |
| 2008/0155524 A1* | 6/2008 | Shone | G06F 8/65 717/168 |
| 2016/0026452 A1* | 1/2016 | Dani | G06F 8/65 717/170 |
| 2019/0179625 A1* | 6/2019 | Rosner | G06F 12/10 |

FOREIGN PATENT DOCUMENTS

| TW | 200903334 A | 1/2009 |
| TW | 200923782 A | 6/2009 |
| TW | 201248404 A | 12/2012 |
| TW | 201823982 A | 7/2018 |
| TW | 201942733 A | 11/2019 |

* cited by examiner

*Primary Examiner* — Jae U Jeon
(74) *Attorney, Agent, or Firm* — Muncy, Geissler, Olds & Lowe, P.C.

(57) ABSTRACT

An electronic processing device including a memory and a Micro Control Unit (MCU) is provided. The memory includes a first memory block and a second memory block. The MCU executes first program code stored in the first memory block to write an update program code into the second memory block, and remaps a base address for a reboot of the electronic processing device from the first memory block to the second memory block in response to successfully writing the update program code into the second memory block. After that, the MCU triggers the reboot of the electronic processing device to execute the update program code stored in the second memory block.

10 Claims, 6 Drawing Sheets

ELECTRONIC PROCESSING DEVICES AND MEMORY CONTROL METHODS THEREOF

CROSS REFERENCE TO RELATED APPLICATIONS

This Application claims priority of Taiwan Patent Application No. 108144856, filed on Dec. 9, 2019, the entirety of which is incorporated by reference herein.

BACKGROUND OF THE APPLICATION

Field of the Application

The application generally relates to memory management technologies and more particularly, to electronic processing deuces and memory control methods thereof.

Description of the Related Art

When compared to general-purpose processors utilized in personal computers, Micro Control Units (MCUs) are more self-supplied (i.e., operable without external hardware), cost-effective, and space-efficient. Therefore, MCUs are more commonly used in consumer electronics, industrial controls, automotive electronics, and mobile communications.

As technology advances, MCUs with more computing power are being developed and used in the field of Internet of Things (IoT). The software/firmware of various electronic products may be updated remotely via the worldwide internet access, amounting to significant cost reductions in terms of time and manpower. For example, a conventional street lamp system generally requires manual operation to complete a software/firmware update. By contrast, the software/firmware update of an advanced street lamp system may be carried out Over The Air (OTA) using IoT (referred to herein as an OTA update).

However, in common practices of OTA updates, the following steps are required: writing the new application code twice, identifying the version of the application code based on the signature of the application code, using a loader code to execute the application code, and using a boot code to load and execute the loader code.

Figure 1:
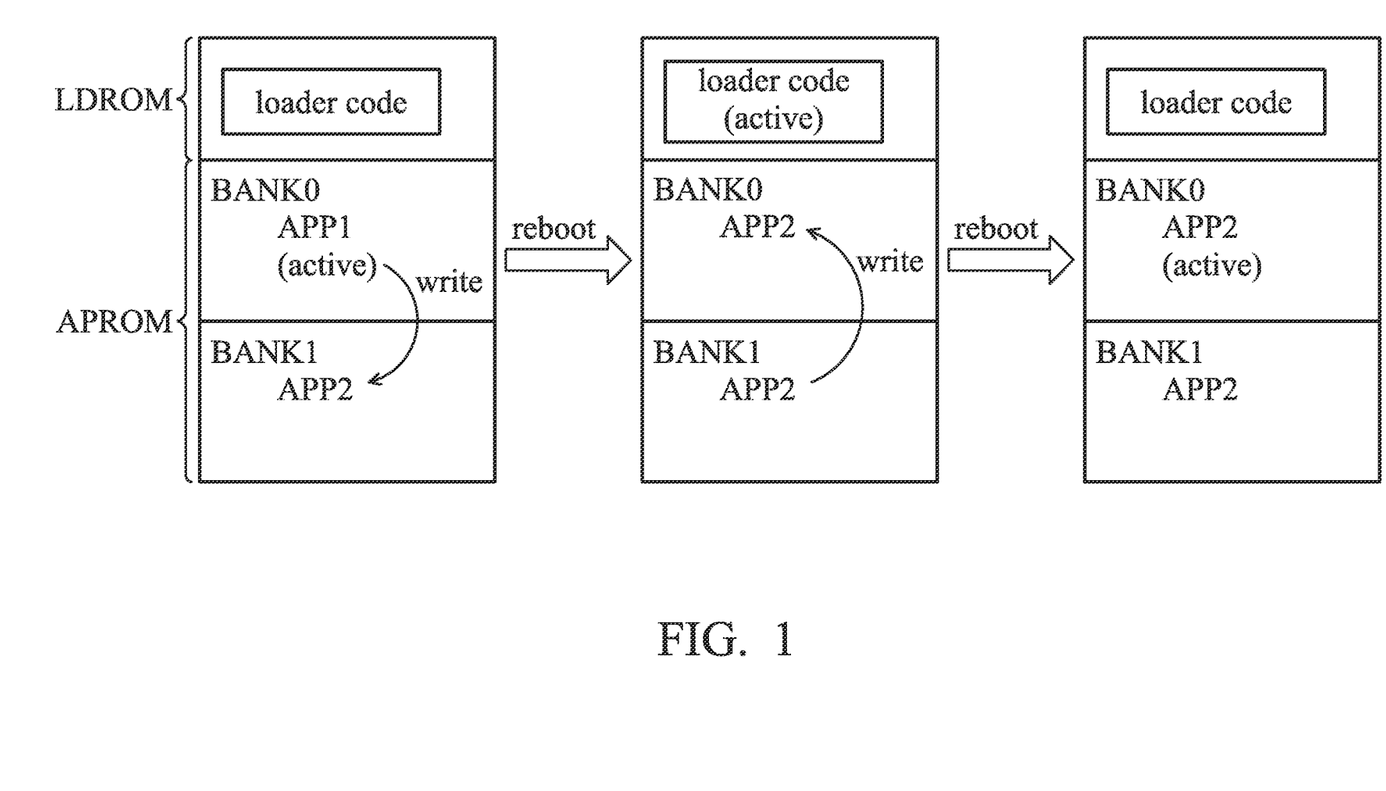
FIG. 1 is a schematic diagram illustrating the memory operations of an OTA update in the prior art.

FIG. 1 is a schematic diagram illustrating the memory operations of an OTA update in the prior art. As shown in FIG. 1, the memory includes an In System Programing (ISP) Loader Read-Only Memory (LDROM) and an Application Program Read Only Memory (APROM). The ISP LDROM stores the loader code. The APROM includes a first memory bank (denoted as BANK0 in FIG. 1) and a second memory bank (denoted as BANK1 in FIG. 1).

At first, upon boot up, the boot code is executed to execute the loader code stored in the ISP LDROM, and then the loader code executes the application code (denoted as APP1 in FIG. 1) stored in BANK0.

Next, when APP1 receives an application update request, it writes the new application code (denoted as APP2 in FIG. 1) into BANK1, and triggers a reboot when APP2 is successfully written into BANK1. In response to the reboot, the boot code is executed to execute the loader code. Then, the loader code determines whether the signature of a newer-version application code is available, and if so, overwrites APP1 with APP2 in BANK0.

After that, when APP1 is successfully overwritten with APP2 in BANK0, another reboot is triggered. In response to the reboot, the boot code is executed to execute the loader code, and subsequently, the loader code executes APP2 stored in BANK0.

It should be noted that two writing processes of the application code and signature-based version control of the application code are required in the prior art, which will inevitably complicate the OTA update process and increase the overall startup time. Moreover, in the writing processes of the application code, it is required to read out the application code stored in the memory, and this may incur the risk of the stored data being leaked or tempered.

BRIEF SUMMARY OF THE APPLICATION

In order to solve the aforementioned problems, the present application proposes an electronic processing device and a memory control method thereof. Specifically, the electronic processing device is allowed to update the application code without the signature-based version control of the application code. Therefore, the loader code is not required during the update. In addition, the two writing processes of the application code are not required to complete the update of the application code. Advantageously, the process of updating the application code is simplified and the overall startup time is reduced. Also, the risk of the stored data being leaked or tempered may be eliminated or reduced.

In a first aspect of the application, an electronic processing device comprising a memory and a Micro Control Unit (MCU) is provided. The memory comprises a first memory block and a second memory block. The MCU is configured to execute first program code stored in the first memory block to write an update program code into the second memory block, remap a base address for a reboot of the electronic processing device from the first memory block to the second memory block in response to successfully writing the update program code into the second memory block, and trigger the reboot of the electronic processing device to execute the update program code stored in the second memory block.

In a first implementation form of the first aspect of the application, the memory further comprises a storage space for storing a configuration, and the MCU is further configured to determine the base address for the reboot of the electronic processing device according to the configuration.

In a second implementation form of the first aspect of the application in combination of the first implementation form of the first aspect of the application, the first program code stored in the first memory block is executed in response to the configuration being set to a first value, and the remapping of the base address comprises setting the configuration to a second value, so as to trigger the reboot of the electronic processing device to execute the update program code stored in the second memory block.

In a third implementation form of the first aspect of the application, the MCU is further configured to configure all or part of the first memory block as an eXecute Only Memory (XOM) and configure all or the same part of the second memory block as an XOM, to protect key program code of the first program code and the update program code.

In a fourth implementation form of the first aspect of the application, the memory is an Application Program Read Only Memory (APROM) or a Serial Peripheral Interface (SPI) flash memory.

In a second aspect of the application, a memory control method, executed by an electronic processing device comprising a memory and an MCU, is provided. The memory control method comprises the following steps: executing first program code stored in a first memory block of the memory to write an update program code into a second memory block of the memory; remapping a base address for a reboot of the electronic processing device from the first memory block to the second memory block in response to successfully writing the update program code into the second memory block; and triggering the reboot of the electronic processing device to execute the update program code stored in the second memory block.

In a first implementation form of the second aspect of the application, the memory further comprises a storage space for storing a configuration, and the memory control method further comprises: determining the base address for the reboot of the electronic processing device according to the configuration.

In a second implementation form of the second aspect of the application in combination of the first implementation form of the second aspect of the application, the first program code stored in the first memory block is executed in response to the configuration being set to a first value, and the remapping of the base address comprises setting the configuration to a second value, so as to trigger the reboot of the electronic processing device to execute the update program code stored in the second memory block.

In a third implementation form of the second aspect of the application, the memory control method further comprises: configuring all or part of the first memory block as an XOM and configuring all or the same part of the second memory block as an XOM, to protect key program code of the first program code and the update program code.

In a fourth implementation form of the second aspect of the application, the memory is an APROM or an SPI flash memory.

Other aspects and features of the present application will become apparent to those with ordinarily skill in the art upon review of the following descriptions of specific embodiments of the electronic processing devices and memory control methods.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
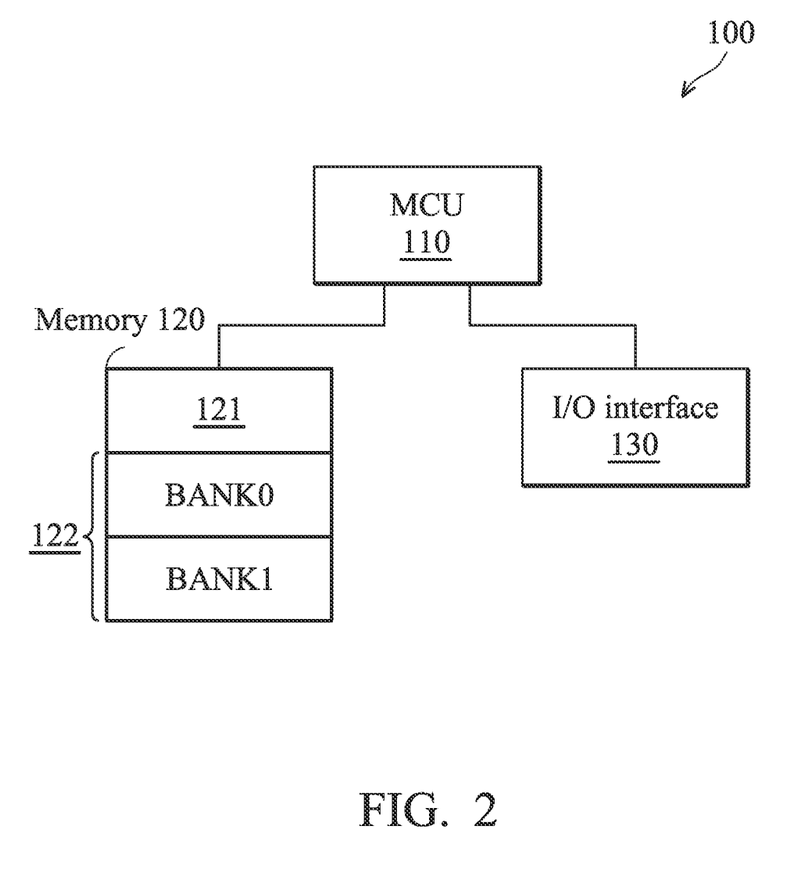
FIG. 2 is a block diagram illustrating an electronic processing device according to an embodiment of the application.

FIG. 2 is a block diagram illustrating an electronic processing device according to an embodiment of the application.

As shown in FIG. 2, the electronic processing device 100 may include a Micro Control Unit (MCU) 110, a memory 120, and an Input/Output (I/O) interface 130. The MCU 110 is coupled to the memory 120 and the I/O interface 130, and is configured to operate on the memory 120 (e.g., to execute and update the application code stored therein), and receiving and/or outputting signals/data (e.g., receiving new application code for update) via the I/O interface 130.

In one embodiment, the electronic processing device 100 may be realized as a single chip micro-controller. That is, the MCU 110, the memory 120, and the I/O interface 130 may be incorporated into a single chip.

In another embodiment, the MCU 110 may be a Micro Processing Unit (MPU), a Digital Signal Processor (DSP), or any micro-processor that includes various circuits for providing the function of data processing and computing.

To further clarify, the memory 120 may be divided into a plurality of storage areas or may consist of a plurality of memory units, wherein the memory units may be the same type or different types of memory (e.g., flash memory). In addition, the memory units may be disposed in the same memory chip (e.g., disposed in an MPU flash memory), or may be disposed in different memory chips (e.g., separately disposed in an MPU flash memory and a Serial Peripheral Interface (SPI) flash memory).

As shown in FIG. 2, the memory 120 may include memory units 121~122.

The memory unit 121 stores various configurations, including a first configuration which is used to determine the base address for reboots of the electronic processing device 100. For example, if the first configuration is set to a first value (e.g., 0), the base address for reboots of the electronic processing device 100 is determined to be the first memory block (denoted as BANK0 in FIG. 2) of the memory unit 122. If the first configuration is set to a second value (e.g., 1), the base address for reboots of the electronic processing device 100 is determined to be the second memory block (denoted as BANK1 in FIG. 2) of the memory unit 122.

In one embodiment, the memory unit 121 may refer to any storage space, such as a word or a register.

The memory unit 122 at least includes two memory blocks, and each memory block may store an application code.

In one embodiment, the memory unit 122 may be an Application Program Read Only Memory (APROM), and each memory block of the memory unit 122 may be a memory bank. The MCU 110 may selectively configure all or part of the memory blocks as Execute Only Memory (XOM), to protect the data stored therein from being leaked or tempered.

In another embodiment, the memory unit 122 may be an SPI flash memory.

The I/O interface 130 may include one or more ports, buttons, and/or a speaker, etc., for receiving and/or outputting signals/data (e.g., receding new application code for update).

It should be understood that the components described in the embodiment of FIG. 2 are for illustrative purposes only and are not intended to limit the scope of the application. For example, the electronic processing device 100 may include more components (e.g., hardware resources), and the memory 120 may include other memory units, such as an ISP LDROM and/or data flash memory. The ISP LDROM may be used to store some special code (e.g., loader code and/or ISP code for firmware updates), while the data flash memory may be used to store user data.

Figure 3:
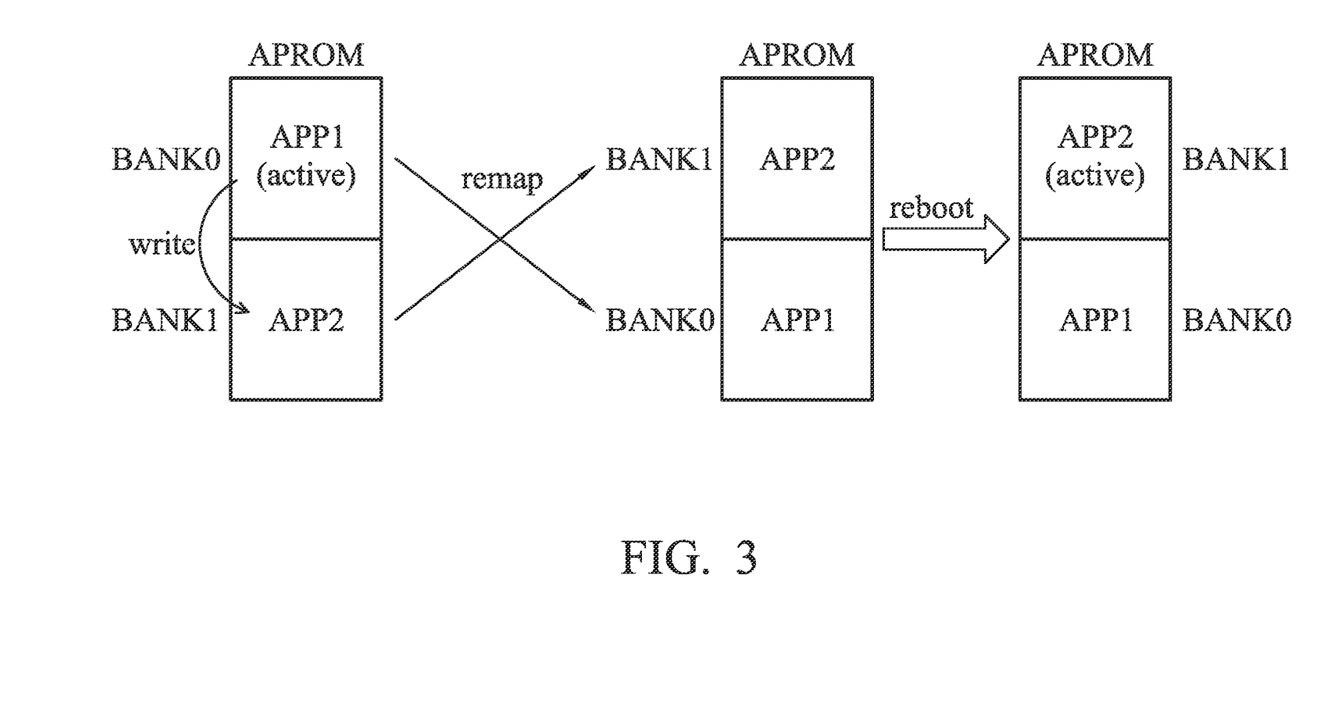
FIG. 3 is a schematic diagram illustrating the memory operations for an update of an application code according to an embodiment of the application.

FIG. 3 is a schematic diagram illustrating the memory operations for an update of an application code according to an embodiment of the application.

As shown in FIG. 3, the memory control method of the present application may carry out the update of an application code by using an APROM including two memory banks, without involving the ISP LDROM and the loader code stored in the ISP LDROM.

In this embodiment, the described memory unit may be an APROM and each memory block may be a memory bank.

To begin with, upon boot up, the MCU 110 executes the application code APP1 stored in the first memory bank (denoted as BANK0 in FIG. 3) in response to the first configuration being set to the first value (e.g., set to 0 as the initial value). Then, the application code APP1 processes the request for application code update, and writes the update application code APP2 into the second memory bank (denoted as BANK1 in FIG. 3).

Next, the MCU 110 remaps the base address for a reboot of the electronic processing device from the first memory bank to the second memory bank in response to successfully writing the update program code APP2 into the second memory bank.

Specifically, the MCU 110 may set the first configuration to a second value (e.g., 1) to realize the remapping of the base address.

It should be understood that in FIG. 3, the second memory bank appears to be on top of the first memory bank after the remapping of the base address, but this does not mean that the physical locations of these two memory banks are swapped. Instead, the remapping of the base address only indicates to the MCU 110 that the starting point of the code to be executed has changed, by setting the first configuration to a different value.

After that, the MCU 110 triggers the reboot of the electronic processing device to execute the update program code APF2 stored in the second memory bank according to the first configuration.

Figure 4:
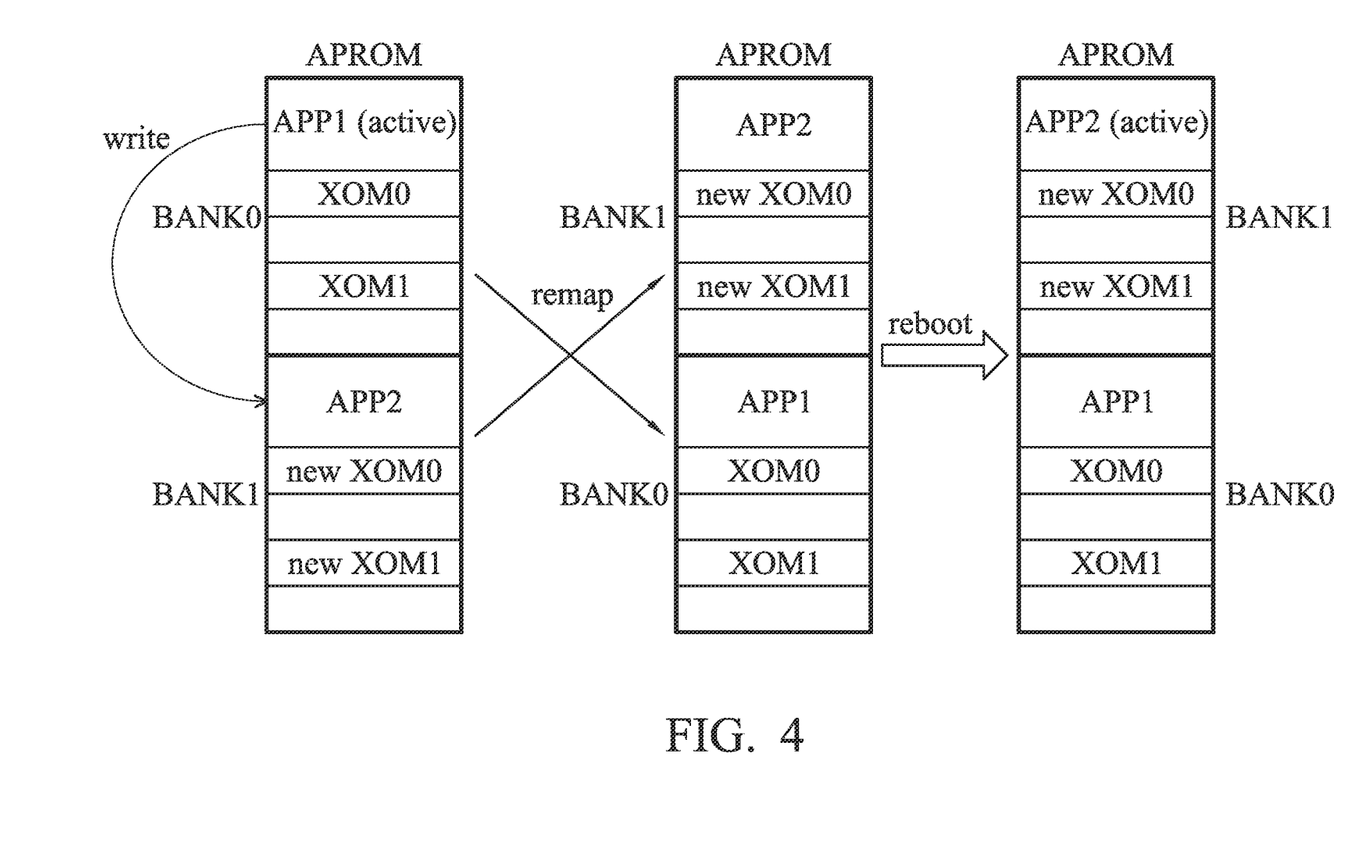
FIG. 4 is a schematic diagram illustrating the memory operations for an update of an application code according to another embodiment of the application.

FIG. 4 is a schematic diagram illustrating the memory operations for an update of an application code according to another embodiment of the application.

Similar to the embodiment of FIG. 3, the update of an application code may be carried out by using an APROM including two memory banks, without involving the ISP LDROM and the loader code stored in the ISP LDROM. Particularly, in this embodiment, all or part of the memory banks are configured as XOM, to protect the data stored therein from being leaked or tempered.

To begin with, upon boot up, the MCU 110 executes the application code APP1 stored in the first memory bank (denoted as BANK0 in FIG. 4) in response to the first configuration being set to the first value (e.g., set to 0 as the initial value). Then, the application code APP1 processes the request for application code update, and writes the update application code APP2 into the second memory bank (denoted as BANK1 in FIG. 4).

Please note that, before or during the processing of the request for application code update, the MCU 110 may configure partial areas (denoted as XOM0 and XOM1 in FIG. 4) of the first memory bank as XOM. These areas may be used to store confidential data, such as algorithms and/or key program code, etc. Alternatively, the MCU 110 may configure the entire first memory bank as XOM.

In response to part of the first memory bank being configured as XOM, the MCU 110 also configures the corresponding parts (denoted as new XOM0 and new XOM1 in FIG. 4) of the second memory bank as XOM, to protect the new application code APP2.

Next, the MCU 110 remaps the base address for a reboot of the electronic processing device from the first memory bank to the second memory bank in response to successfully writing the update program code APP2 into the second memory bank.

Specifically, the MCU 110 may set the first configuration to a second value (e.g., 1) to realize the remapping of the base address.

It should be understood that in FIG. 4, the second memory bank appears to be on top of the first memory bank after the remapping of the base address, but this does not mean that the physical locations of these two memory banks are swapped. Instead, the remapping of the base address only indicates to the MCU 110 that the starting point of the code to be executed has changed, by setting the first configuration to a different value.

After that, the MCU 110 triggers the reboot of the electronic processing device to execute the update program code APP2 stored in the second memory bank according to the first configuration.

Figure 5:
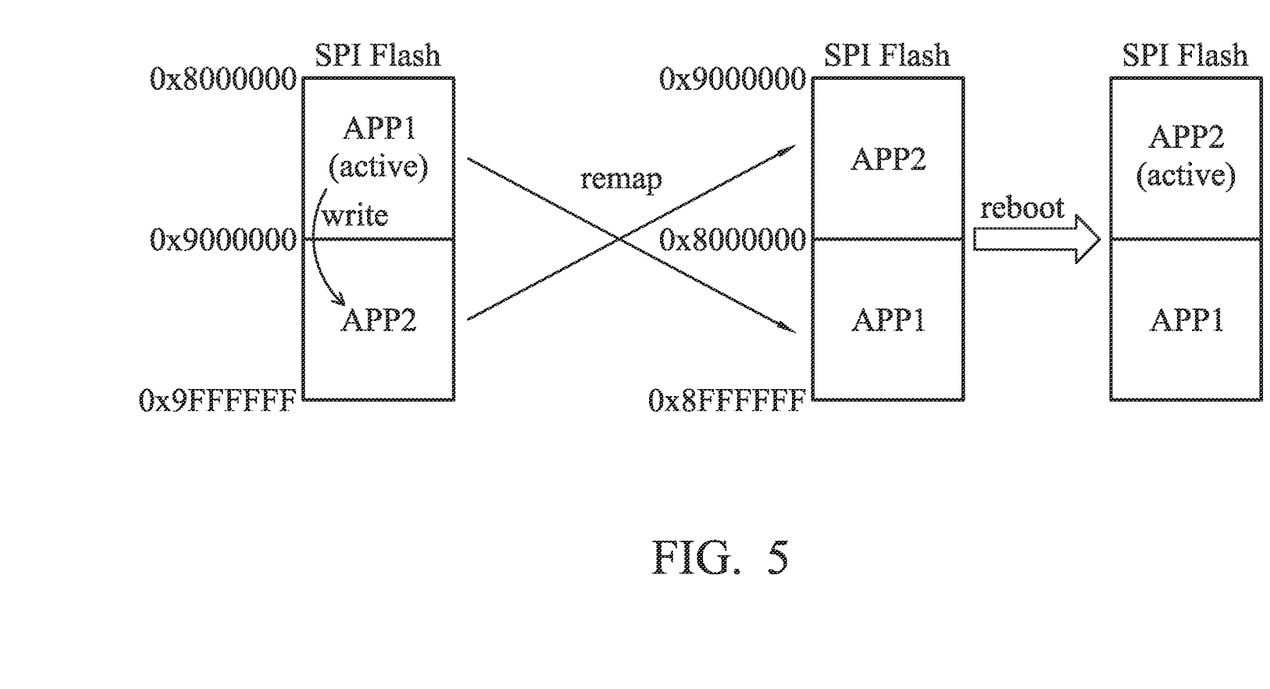
FIG. 5 is a schematic diagram illustrating the memory operations for an update of an application code according to yet another embodiment of the application.

FIG. 5 is a schematic diagram illustrating the memory operations for an update of an application code according to yet another embodiment of the application.

In this embodiment, the described memory unit may be an SPI flash memory which is especially applicable when the application code is large in size and cannot be stored in the built-in flash memory of an MPU. Also, each of the described memory block may be any memory block of the SPI flash memory, and the size of each memory block may be configured depending on the size of the program code. For example, the first memory block may be configured to start from the memory address 0x8000000 to the memory address 0x8FFFFFF, while the second memory block may be configured to start from the memory address 0x9000000 to the memory address 0x9FFFFFF, but the application is not limited thereto.

To begin with, upon boot up, the MCU 110 executes the application code APP1 stored in the first memory bank in response to the first configuration being set to the first value (e.g. set to 0 as the initial value). Then, the application code APP1 processes the request for application code update, and writes the update application code APP2 into the second memory bank.

Next, the MCU 110 remaps the base address for a reboot of the electronic processing device from the first memory bank to the second memory bank in response to successfully writing the update program code APP2 into the second memory bank.

Specifically, the MCU 110 may set the first configuration to a second value (e.g., 1) to realize the remapping of the base address.

It should be understood that in FIG. 5, the second memory bank appears to be on top of the first memory bank after the remapping of the base address, but this does not mean that the physical locations of these two memory banks are swapped. Instead, the remapping of the base address only indicates to the MCU 110 that the starting point of the code to be executed has changed, by setting the first configuration to a different value.

After that, the MCU 110 triggers the reboot of the electronic processing device to execute the update program code APP2 stored in the second memory bank according to the first configuration.

Figure 6:
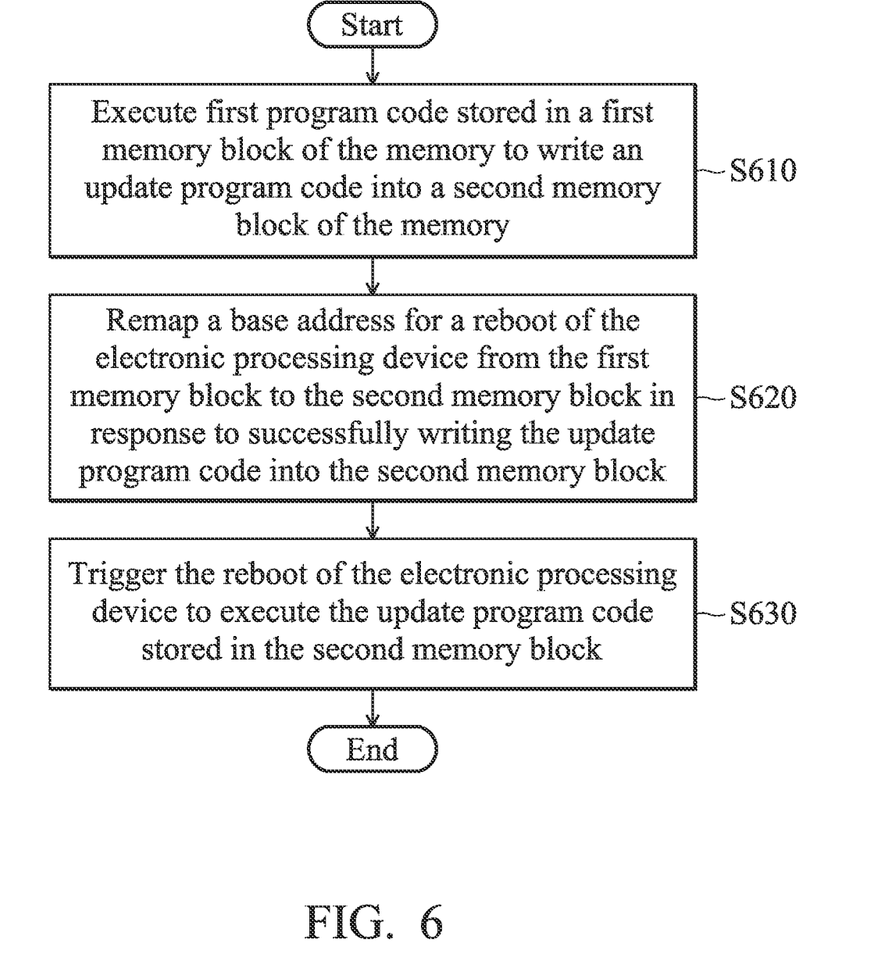
FIG. 6 is a flow chart illustrating the memory control method according to an embodiment of the application.

FIG. 6 is a flow chart illustrating the memory control method according to an embodiment of the application.

In this embodiment, the memory control method is applied to an electronic processing device (e.g., the electronic processing device 100) including an MCU (e.g., the MCU 110) and a memory (e.g., the memory 120), and executed by the MCU to operate on the memory.

To begin with, the MCU executes first program code (e.g., APP1) stored in a first memory block of the memory to write an update program code (e.g., APP2) into a second memory block of the memory (step S610).

Next, the MCU remaps a base address for a reboot of the electronic processing device from the first memory block to the second memory block in response to successfully writing the update program code into the second memory block (step S620).

Specifically, the remapping of the base address may be realized by setting a specific configuration to a predetermined value (e.g., 1). For each reboot of the electronic processing device, the starting point of the code to be executed is determined to be whether the first memory block or the second memory block based on the value of the specific configuration.

In one embodiment, the specific configuration may be a word or a register. For example, the starting point is the first memory block if the specific configuration is set to 0. Otherwise, if the specific configuration is set to 1, the starting point is the second memory block.

After that, the MCU triggers the reboot of the electronic processing device to execute the update program code stored in the second memory block (step S630), and the method ends.

In one embodiment, the described memory may be an APROM (exemplified in FIGS. 3~4) or an SPI flash memory (exemplified in FIG. 5). However, it should be understood that the types of memory described in the embodiments of FIGS. 3~5 are for illustrative purposes only and are not intended to limit the scope of the application. The memory control method of the present application may also be applied to other types of memory.

In view of the forgoing embodiments, it will be appreciated that the memory control method of the present application requires only one writing process of the application code and does not involve the loader code for signature-based version control of the application code. Advantageously, the process of updating the application code is simplified and the overall startup time is reduced. Moreover, since it is not required to have a second writing process of the application code, the update program code will not be read, and thus, the risk of the stored data being leaked or tempered may be eliminated or reduced.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. An electronic processing device, comprising:
a memory, comprising a first memory block and a second memory block; and
a Micro Control Unit (MCU), configured to execute first program code stored in the first memory block to write an update program code into the second memory block, remap a base address for a reboot of the electronic processing device from the first memory block to the second memory block in response to successfully writing the update program code into the second memory block, and trigger the reboot of the electronic processing device to execute the update program code stored in the second memory block.

2. The electronic processing device of claim 1, wherein the memory further comprises a storage space for storing a configuration, and the MCU is further configured to determine the base address for the reboot of the electronic processing device according to the configuration.

3. The electronic processing device of claim 2, wherein the first program code stored in the first memory block is executed in response to the configuration being set to a first value, and the remapping of the base address comprises setting the configuration to a second value, so as to trigger the reboot of the electronic processing device to execute the update program code stored in the second memory block.

4. The electronic processing device of claim 1, wherein the MCU is further configured to configure all or part of the first memory block as an eXecute Only Memory (XOM) and configure all or the same part of the second memory block as an XOM, to protect key program code of the first program code and the update program code.

5. The electronic processing device of claim 1, wherein the memory is an Application Program Read Only Memory (APROM) or a Serial Peripheral Interface (SPI) flash memory.

6. A memory control method for an electronic processing device comprising a memory and an MCU, the memory control method comprising:
executing first program code stored in a first memory block of the memory to write an update program code into a second memory block of the memory;
remapping a base address for a reboot of the electronic processing device from the first memory block to the second memory block in response to successfully writing the update program code into the second memory block; and
triggering the reboot of the electronic processing device to execute the update program code stored in the second memory block.

7. The memory control method of claim 6, wherein the memory further comprises a storage space for storing a configuration, and the memory control method further comprises:
determining the base address for the reboot of the electronic processing device according to the configuration.

8. The memory control method of claim 7, wherein the first program code stored in the first memory block is executed in response to the configuration being set to a first value, and the remapping of the base address comprises setting the configuration to a second value, so as to trigger the reboot of the electronic processing device to execute the update program code stored in the second memory block.

9. The memory control method of claim 6, further comprising:
configuring all or part of the first memory block as an XOM and configuring all or the same part of the second memory block as an XOM, to protect key program code of the first program code and the update program code.

10. The memory control method of claim 6, wherein the memory is an APROM or an SPI flash memory.

\* \* \* \* \*